United States Patent
Kim et al.

(10) Patent No.: US 11,875,948 B2
(45) Date of Patent: *Jan. 16, 2024

(54) MULTILAYER CAPACITOR AND SUBSTRATE INCLUDING THE SAME MOUNTED THEREON

(71) Applicant: SAMSUNG ELECTRO-MECHANICS CO., LTD., Suwon-si (KR)

(72) Inventors: Hwi Dae Kim, Suwon-si (KR); Sang Soo Park, Suwon-si (KR); Chan Yoon, Suwon-si (KR); Woo Chul Shin, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,012

(22) Filed: Feb. 25, 2022

(65) Prior Publication Data

US 2022/0181089 A1  Jun. 9, 2022

Related U.S. Application Data

(63) Continuation of application No. 16/778,673, filed on Jan. 31, 2020, now Pat. No. 11,594,375.

(30) Foreign Application Priority Data

Jul. 24, 2019 (KR) .................. 10-2019-0089773

(51) Int. Cl.
*H01G 4/30* (2006.01)
*H01G 2/02* (2006.01)
(Continued)

(52) U.S. Cl.
CPC ............. *H01G 4/30* (2013.01); *H01G 2/02* (2013.01); *H01G 4/012* (2013.01); *H01G 4/1209* (2013.01)

(58) Field of Classification Search
CPC ........... H01G 2/02; H01G 4/30; H01G 4/012; H01G 4/1209
(Continued)

(56) References Cited

U.S. PATENT DOCUMENTS

| 6,014,309 A | 1/2000 | Ueno et al. | |
| 6,229,686 B1 * | 5/2001 | Shimahara | ............... H01G 4/30 361/321.5 |

(Continued)

FOREIGN PATENT DOCUMENTS

| CN | 105097282 A | 11/2015 |
| CN | 106024382 A | 10/2016 |

(Continued)

OTHER PUBLICATIONS

U.S. Office Action dated Jun. 9, 2022, issued in corresponding U.S. Appl. No. 16/778,673.

(Continued)

*Primary Examiner* — Arun Ramaswamy
(74) *Attorney, Agent, or Firm* — Morgan, Lewis & Bockius LLP

(57) ABSTRACT

A multilayer capacitor includes a capacitor body having an active region, upper and lower cover regions, and width margins on opposing sides of the active region. The width margin includes a first region on an internal side thereof adjacent the first and second internal electrodes and a second region on an external side between the first region and a respective external surface of the capacitor body, and he upper and lower cover regions each include a third region on an internal side thereof adjacent the internal electrodes and (Continued)

a fourth region on an external side between the third region and a respective external surface of the capacitor body. The active region, the second region, and the fourth region have a same dielectric constant A, and the first and third regions have a same dielectric constant B, and A and B are different from each other and satisfy $0.5 \leq B/A$.

25 Claims, 4 Drawing Sheets

(51) Int. Cl.
*H01G 4/12* (2006.01)
*H01G 4/012* (2006.01)

(58) Field of Classification Search
USPC ............... 361/312, 301.4, 321.1, 306.3, 311
See application file for complete search history.

(56) References Cited

U.S. PATENT DOCUMENTS

| | | | |
|---|---|---|---|
| 10,522,293 | B2 | 12/2019 | Sakate et al. |
| 2004/0233612 | A1* | 11/2004 | Sugimoto ............... H01G 4/30 361/312 |
| 2014/0085852 | A1* | 3/2014 | Park ..................... H01G 4/224 361/782 |
| 2015/0036264 | A1 | 2/2015 | Morita et al. |
| 2015/0340155 | A1 | 11/2015 | Fukunaga et al. |
| 2016/0005543 | A1 | 1/2016 | Wada et al. |
| 2016/0196918 | A1 | 7/2016 | Hong et al. |
| 2016/0284473 | A1 | 9/2016 | Murosawa et al. |
| 2017/0133156 | A1 | 5/2017 | Wada et al. |
| 2018/0261390 | A1 | 9/2018 | Sakate et al. |
| 2019/0362897 | A1* | 11/2019 | Kato ..................... H01G 4/232 |
| 2021/0027947 | A1 | 1/2021 | Kim et al. |

FOREIGN PATENT DOCUMENTS

| | | |
|---|---|---|
| CN | 108573811 A | 9/2018 |
| JP | 10-312933 A | 11/1998 |
| JP | 2011-009369 A | 1/2011 |
| KR | 10-2016-0084614 A | 7/2016 |

OTHER PUBLICATIONS

Chinese Office Action dated Jul. 21, 2022, issued in corresponding Chinese Patent Application No. 202010299955.7.

* cited by examiner

II-II'

MULTILAYER CAPACITOR AND SUBSTRATE INCLUDING THE SAME MOUNTED THEREON

CROSS-REFERENCE TO RELATED APPLICATION(S)

The present application is the continuation application of U.S. patent application Ser. No. 16/778,673 filed Jan. 31, 2020, now U.S. Pat. No. 11,594,375 issued on Feb. 28, 2023, which claims the benefit of priority to Korean Patent Application No. 10-2019-0089773 filed on Jul. 24, 2019 in the Korean Intellectual Property Office, the disclosure of which is incorporated herein by reference in its entirety.

BACKGROUND

1. Field

The present disclosure relates to a multilayer capacitor and a substrate including the multilayer capacitor mounted thereon.

2. Description of Related Art

Electronic components using a ceramic material may include a capacitor, an inductor, a piezoelectric element, a varistor, a thermistor, or the like.

Among the above-mentioned components, a multilayer capacitor may be used in various types of electronic devices, as such a multilayer capacitor may have a small size and may implement high capacitance.

Recently, a multilayer capacitor has been increasingly used in vehicle products, as well as in IT produces, and a multilayer capacitor used in vehicle products may be required to have high reliability for use in harsh driving environments.

A multilayer capacitor may include a capacitor body formed of a ceramic material, an internal electrode disposed in the capacitor body, and an external electrode installed on a surface of the capacitor body and connected to the internal electrode.

To reduce a size of a multilayer capacitor, a technique of reducing a thickness of a multilayer capacitor has been used. However, when a thickness of a multilayer capacitor is reduced, an electric field may be intensely formed on ends of an internal electrode when voltage is applied, and the concentration of an electric field may cause insulating breakdown, one of defects of a multilayer capacitor, and may degrade reliability.

Thus, a need exists to secure high capacitance and to alleviate an electric field concentrated on ends of an internal electrode.

SUMMARY

An aspect of the present disclosure is to provide a multilayer capacitor which may have increased capacitance by increasing an area of an internal electrode and may alleviate concentration of an electric field on an interfacial surface between an active region in which ends of an internal electrode are exposed and a margin portion of a capacitor body.

According to an aspect of the present disclosure, a multilayer capacitor includes a capacitor body including first internal electrodes and second internal electrodes that are alternately disposed with dielectric layers therebetween, and having first and second surfaces opposing each other, third and fourth surfaces connected to the first and second surfaces and opposing each other, fifth and sixth surfaces connected to the first and second surfaces and to the third and fourth surfaces and opposing each other. The first internal electrodes are exposed through the third surface, and the second internal electrodes are exposed through the fourth surface. First and second external electrodes are disposed on the third and fourth surfaces, respectively, and connected to the first and second internal electrodes, respectively. The capacitor body further includes an active region in which the first and second internal electrodes are alternately disposed with the dielectric layers interposed therebetween, and upper and lower cover regions respectively disposed above an uppermost internal electrode and below a lowermost internal electrode in a layering direction of the first and second internal electrodes. Width margins of the capacitor body are free of the first and second internal electrodes and are disposed on both opposite sides of the active region in a direction connecting the fifth surface and the sixth surface to each other, each width margin includes a first region disposed on an internal side thereof adjacent the first and second internal electrodes and a second region disposed on an external side between the first region and a respective external surface of the capacitor body, and the upper and lower cover regions each include a third region disposed on an internal side thereof adjacent the first and second internal electrodes and a fourth region disposed on an external side between the third region and a respective external surface of the capacitor body. The active region, the second region, and the fourth region have a same dielectric constant A, and the first region and the third region have a same dielectric constant B, and A and B are different from each other and satisfy $0.5 \leq B/A$.

A and B may satisfy $0.937 \leq B/A$.

When an average thickness of the dielectric layer is defined as C, an average thickness of the first internal electrode or the second internal electrode is defined as D, and an average width of the first region or the third region is defined as E, C, D, and E may satisfy $C \leq E$ and $D \leq E$.

A grain size of the active region, the second region, and the fourth region may be greater than a grain size of the first region and the third region.

An average thickness of the first and second internal electrodes may be 0.4 µm or less.

An average thickness of the dielectric layer may be greater than 0.5 µm.

The first and second external electrodes may include respective first and second connection portions disposed on the third and fourth surfaces of the capacitor body, respectively, and connected to the first and second internal electrodes, respectively, and respective first and second band portions each extending to a respective portion of the first surface of the capacitor body from the first and second connection portions, respectively.

According to an aspect of the present disclosure, a substrate includes a multilayer capacitor mounted thereon, and the substrate further includes a substrate including first and second electrode pads on one surface of the substrate. First and second external electrodes are mounted on and connected to the first and second electrode pads, respectively.

According to another aspect of the present disclosure, a multilayer capacitor includes a capacitor body including a dielectric material, and having internal electrodes including first internal electrodes and second internal electrodes that are alternately disposed with dielectric layers therebetween. First and second external electrodes are disposed on external surfaces of the capacitor body and respectively connected to the first and second internal electrodes. An average thickness of the first and second internal electrodes is 0.4 µm or less, and a dielectric constant A of the dielectric layers in a region between the first internal electrodes and the second internal electrodes is different from a dielectric constant B of the dielectric material of the capacitor body in a region disposed between the internal electrodes and the external surfaces of the capacitor body.

According to a further aspect of the present disclosure, a multilayer capacitor includes a capacitor body including a dielectric material, and having internal electrodes including first internal electrodes and second internal electrodes that are alternately disposed with dielectric layers therebetween. First and second external electrodes are disposed on external surfaces of the capacitor body and respectively connected to the first and second internal electrodes. An average thickness of the first and second internal electrodes is 0.4 µm or less, and a dielectric constant B of the dielectric material of the capacitor body in a first region disposed between the internal electrodes and the external surfaces of the capacitor body is different from a dielectric constant A of the dielectric material of the capacitor body in a second region disposed between the first region and the external surfaces of the capacitor body.

According to a further aspect of the present disclosure, a multilayer capacitor includes a capacitor body including a dielectric material, and having internal electrodes including first internal electrodes and second internal electrodes that are alternately disposed with dielectric layers therebetween. First and second external electrodes are disposed on external surfaces of the capacitor body and respectively connected to the first and second internal electrodes. A dielectric constant B of the dielectric material of the capacitor body in a first region disposed between the internal electrodes and the external surfaces of the capacitor body is different from a dielectric constant A of the dielectric material of the capacitor body in a second region disposed between the first region and the external surfaces of the capacitor body, and an average width E of the first region and an average thickness C of the dielectric layers between internal electrodes satisfy C≤E.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
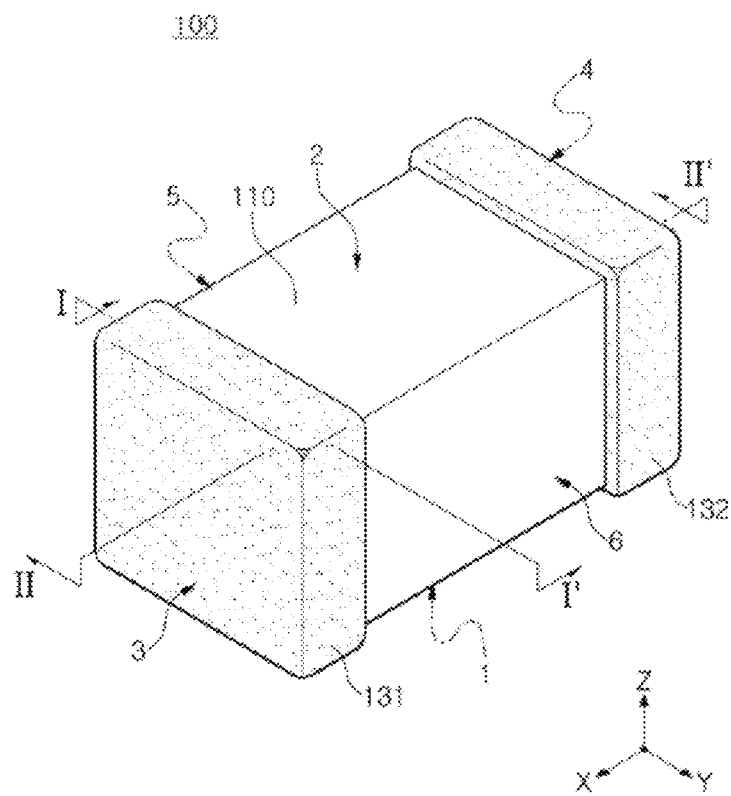
FIG. 1 is a perspective diagram illustrating a multilayer capacitor according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

Further, throughout the specification, it will be understood that when a portion "includes" an element, it can further include another element, thereby not excluding the other element, unless otherwise indicated.

In the drawings, an X direction, a Y direction, and a Z direction may indicate a length direction, a width direction, and a thickness direction of a multilayer capacitor, respectively.

The Z direction may be the same as a layering or stacking direction in which the dielectric layers are layered or stacked.

Figure 2A:
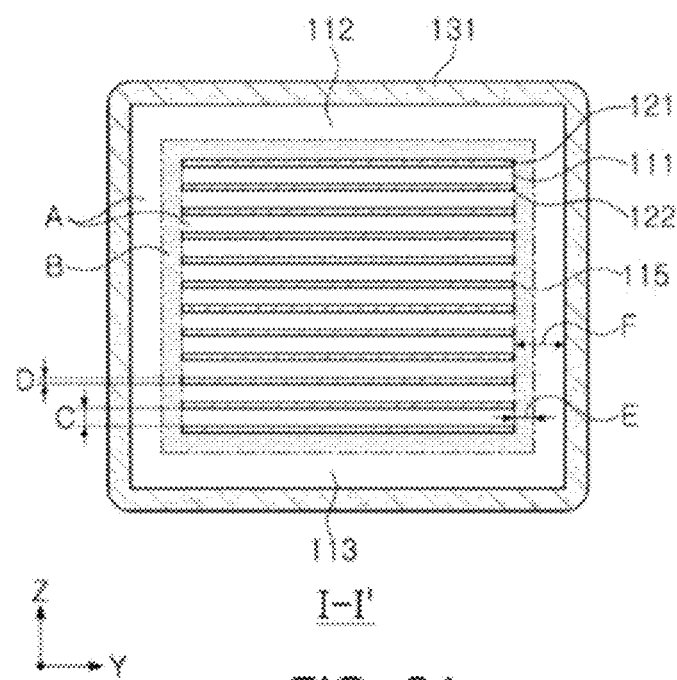
FIG. 2A is a cross-sectional view taken along line I-I' in FIG. 1.
Figure 3:
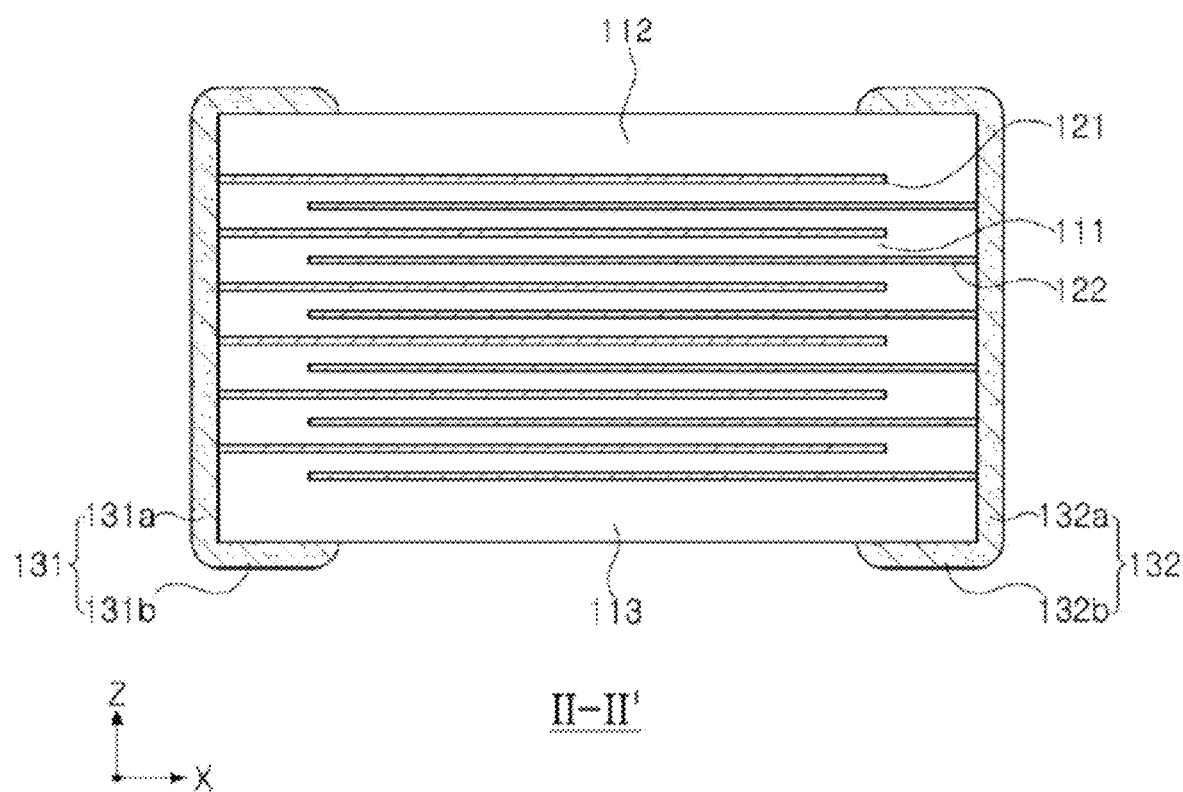
FIG. 3 is a cross-sectional view taken along line II-II' in FIG. 1.
Figure 4A:
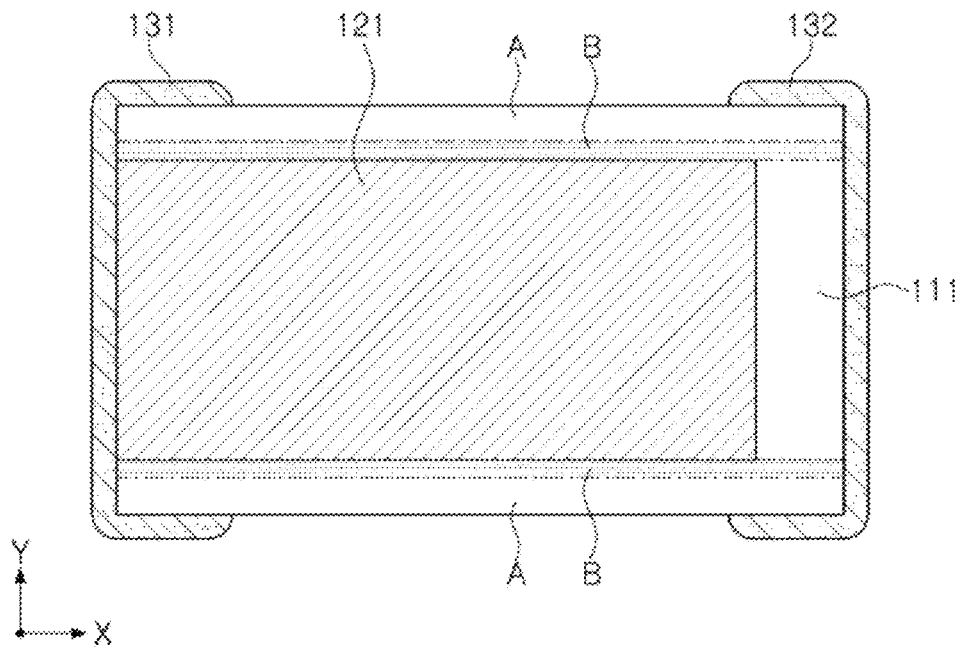
FIGS. 4A and 4B are cross-sectional views illustrating structures of first and second internal electrodes of the multilayer capacitor illustrated in FIG. 1, respectively.
Figure 4B:
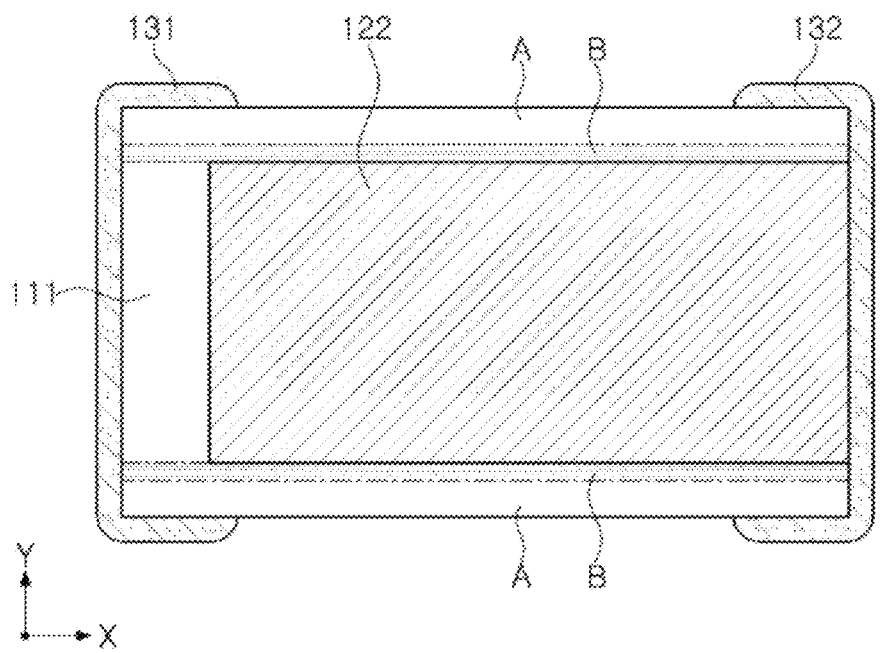

FIG. 1 is a perspective diagram illustrating a multilayer capacitor according to an example embodiment. FIG. 2A is a cross-sectional view taken along line I-I' in FIG. 1. FIG. 3 is a cross-sectional view taken along line II-II' in FIG. 1. FIGS. 4A and 4B are cross-sectional views illustrating structures of first and second internal electrodes applied in the multilayer capacitor illustrated in FIG. 1, respectively.

In the description below, a multilayer capacitor in the example embodiment will be described with reference to FIGS. 1, 2A, 3, 4A, and 4B.

Referring to FIGS. 1, 2A, 3, 4A, and 4B, a multilayer capacitor 100 in the example embodiment may include a capacitor body 110 and first and second external electrodes 131 and 132.

The capacitor body 110 may include an active region 115 as well as upper and lower cover regions 112 and 113. The active region 115 may correspond to a region having the first and second internal electrodes 121 and 122 stacked therein and forming capacitance. The upper and lower cover regions 112 and 113 may be outside of the active region, and may include the regions above an uppermost internal electrode 121 and below a lowermost internal electrode 122 of the active region 115.

The upper and lower cover regions 112 and 113 may be divided into a third region on an internal side thereof, adjacent to the active region 115 and the internal electrodes 121 and 122, and a fourth region on an external side thereof, in contact with external side surface(s) of the capacitor body 110. For example, in FIG. 2A, the third region may correspond to upper and lower segments of region 'B', and the fourth region may correspond to upper and lower segments of the outer/peripheral region 'A.'

Note that in some embodiments, the upper and lower cover regions 112 and 113 may only include the third region, and may not include the fourth region. In such embodiments, the third region may include the entire upper and lower cover region, such that the upper region may extend integrally from the upper surface of the active region 115 to the upper surface of the capacitor body 110 and from the lower surface of the active region 115 to the lower surface of the capacitor body 110.

A margin outside of and adjacent to the active region 115 taken in a Y direction may be defined as a width margin, and the width margin may be divided into a first region on an internal side thereof, adjacent to the active region 115 and edges of the internal electrodes 121 and 122, and a second region on an external side thereof, in contact with external side surface(s) of the capacitor body 110. For example, in FIG. 2A, the first region may correspond to left and right side segments of region 'B', and the second region may correspond to left and right side segments of the outer/peripheral region 'A.'

Figure 2B:
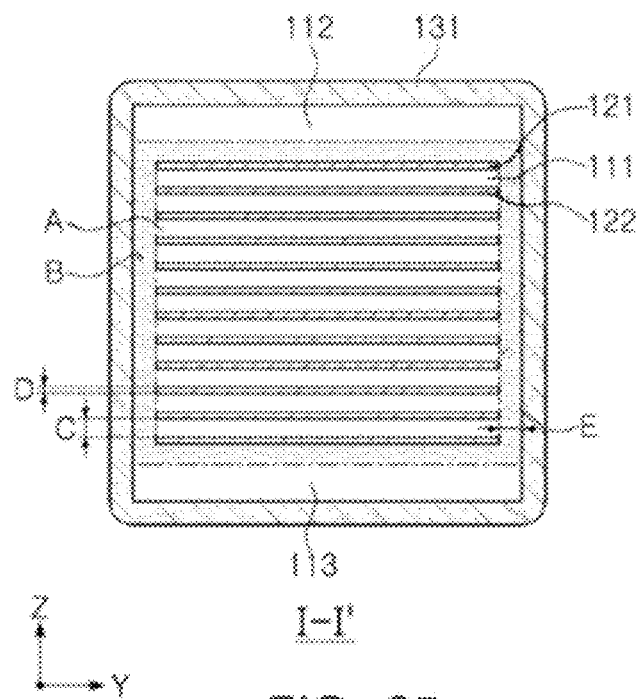
FIG. 2B is a cross-sectional view of an alternate embodiment of the multilayer capacitor of the present disclosure taken along line I-I' in FIG. 1.

Note that in some embodiments, such as the embodiment shown in FIG. 2B, the width margin may only include the first region, and may not include the second region. In such embodiments, the first region may extend across an entire width of the width margin. The first region may thereby include the entire width margins, such that a left width margin may extend integrally from the left surface of the active region 115 to the left outer surface of the capacitor body 110 and a right width margin may extend integrally from the right surface of the active region 115 to the right outer surface of the capacitor body 110.

Dielectric constants of the active region 115, the second region, and the fourth regions may be the same, and dielectric constants of the first region and the third region may be the same.

When a dielectric constant of the active region 115, a dielectric constant of the second region, and a dielectric constant of the fourth region are defined as A, and when a dielectric constant of the first region and a dielectric constant of the third region are defined as B, A and B may satisfy $0.5 \leq B/A$.

The capacitor body 110 may be formed by layering a plurality of dielectric layers 111 in a Z direction and sintering the layered dielectric layers. A boundary between adjacent dielectric layers 111 of the capacitor body 110 may be integrated such that it may be difficult to identify the boundary without using a scanning electron microscope (SEM).

The capacitor body 110 may include a plurality of dielectric layers 111 and first and second internal electrodes 121 and 122 having different polarities and disposed alternately in a Z direction with respective dielectric layers 111 interposed therebetween.

The capacitor body 110 may include an active region 115 contributing to forming capacitance of the capacitor 100, in which the first and second internal electrodes 121 and 122 are alternately layered in a Z direction with the dielectric layers 111 interposed therebetween, and upper and lower cover regions 112 and 113 disposed on upper and lower surfaces of the active region 115 in the Z direction, respectively, as margin portions. The upper and lower cover regions 112 and 113 may respectively be disposed immediately above an uppermost internal electrode and immediately below a lowermost internal electrode of the capacitor body 110 to respectively be in contact with the uppermost internal electrode and lowermost internal electrode of the capacitor body 110.

A shape of the capacitor body 110 may not be limited to any particular shape. The capacitor body 110 may have a hexahedral shape, for example, and may have first and second surfaces 1 and 2 opposing each other in a Z direction, third and fourth surfaces 3 and 4 connected to the first and second surfaces 1 and 2 and opposing each other in an X direction, and fifth and sixth surfaces connected to the first and second surfaces 1 and 2 and to the third and fourth surfaces 3 and 4 and opposing each other in the Y direction. The first surface 1 may be a mounting surface.

The dielectric layer 111 may include a ceramic powder, such as a $BaTiO_3$ based ceramic powder, and the like, for example.

A $BaTiO_3$ based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially employed in $BaTiO_3$, but an example of the $BaTiO_3$ based ceramic powder may not be limited thereto.

The dielectric layer 111 may further include ceramic additives, organic solvents, plasticizers, coupling agents, dispersing agents, and the like, in addition to the ceramic powder.

The ceramic additive may include, for example, a transition metal oxide or a transition metal carbide, a rare earth element, magnesium (Mg) or aluminum (Al), and the like.

An average thickness C of the dielectric layer 111 may be greater than 0.5 μm.

When the average thickness C of the dielectric layer 111 is 0.5 μm or less, breakdown voltage (BDV) may degrade.

The first and second internal electrodes 121 and 122 may be applied with different polarities, and may be disposed on the dielectric layer 111 and may be layered in the Z direction. The first and second internal electrodes 121 and 122 may be alternately disposed in the capacitor body 110 in the Z direction to oppose each other with a single dielectric layer 111 interposed between each pair of adjacent internal electrode.

The first and second internal electrodes 121 and 122 may be electrically insulated from each other by the dielectric layers 111 interposed therebetween.

The first internal electrode(s) 121 may be exposed through the third surface 3 of the dielectric layer(s) 111 and capacitor body 110.

The second internal electrode(s) 122 may be exposed through the fourth surface 4 of the dielectric layer(s) 111 and capacitor body 110.

Ends of the first and second internal electrodes 121 and 122 respectively exposed through the third and fourth surfaces 3 and 4 of the capacitor body 110 may be respectively electrically connected to the first and second external electrodes 131 and 132 disposed on opposing ends of the capacitor body 110 taken in the X direction.

Accordingly, when a certain level of voltage is applied to the first and second external electrodes 131 and 132, an electrical charge may be accumulated between the first and second internal electrodes 121 and 122.

Capacitance of the multilayer capacitor 100 may be proportional to an area of overlap between the first and second internal electrodes 121 and 122, overlapping with each other in the Z direction in the active region 115.

A material of the first and second internal electrodes 121 and 122 may not be limited to any particular material. For example, the first and second internal electrodes 121 and 122 may be formed of a conductive paste including one or more of noble metals or nickel (Ni) and copper (Cu).

As a method of printing the conductive paste, a screen printing method, a gravure method, or the like, may be used, but an example of the method of formation of the internal electrodes may not be limited thereto.

An average thickness D of the first and second internal electrodes 121 and 122 may be 0.4 μm or less.

When the average thickness D of the first and second internal electrodes 121 and 122 is greater than 0.4 μm, a thickness of the capacitor body 110 may increase such that it may be difficult to implement high capacitance of the multilayer capacitor having a reduced size.

The first and second external electrodes 131 and 132 may be provided with voltages having different polarities, may be disposed on and cover opposing ends of the body 110 arranged in the X direction, and may be respectively electrically connected to the exposed portions of the first and second internal electrodes 121 and 122 respectively exposed through the third and fourth surfaces 3 and 4 of the capacitor body 110.

The first external electrode 131 may include a first connection portion 131*a* and a first band portion 131*b*.

The first connection portion 131*a* may be disposed on the third surface 3 of the capacitor body 110, may be in contact with end(s) of the first internal electrode(s) 121 externally exposed through the third surface 3 of the capacitor body 110, and may physically and electrically connect the first internal electrode(s) 121 and the first external electrode 131 to each other.

The first band portion 131*b* may be a portion extending from the first connection portion 131*a* to a portion of the first surface 1 of the capacitor body 110.

If desired, the first band portion 131*b* may further extend towards and onto the second, fifth, and sixth surfaces 2, 5, and 6 of the capacitor body 110 to improve adhesion strength, and for other purposes.

The second external electrode 132 may include a second connection portion 132*a* and a second band portion 132*b*.

The second connection portion 132*a* may be disposed on the fourth surface 4 of the capacitor body 110, may be in contact with end(s) of the second internal electrode(s) 122 exposed externally through the fourth surface 4 of the capacitor body 110, and may physically and electrically connect the second internal electrode (s) 122 and the second external electrode 132 to each other.

The second band portion 132*b* may be a portion extending to a portion of the first surface 1 of the capacitor body 110 from the second connection portion 132*a*.

If desired, the second band portion 132*b* may further extend towards and onto the second, fifth, and sixth surfaces 2, 5, and 6 of the capacitor body 110 to improve adhesion strength, and for other purposes.

In the example embodiment, when a dielectric constant of the active region 115 and dielectric constants of the second and fourth regions of the capacitor body 110 are defined as A, and dielectric constants of the first and third regions of the capacitor body 110 are defined as B, A and B satisfy $0.5 \leq B/A$.

More preferably, B/A may satisfy $0.937 \leq B/A$.

Also, when an average thickness of the dielectric layer(s) 111 is defined as C, an average thickness of the first internal electrode(s) 121 or the second internal electrode(s) 122 is defined as D, an average width of the first region or the third region is defined as E, and an average thickness of the width margins is defined as F, C, D, and E may satisfy $C \leq E$ and $D \leq E$.

When the average width E of the first region or the third region is less than the average thickness C of the dielectric layer 111, electric field distortion may increase due to a fringing field, and it may be highly likely that breakdown voltage may occur in the margin portion taken in the width direction and the upper and lower cover regions 112 and 113.

Also, when the average width E of the first region or the third region is less than the average thickness D of the first internal electrode 121 or the second internal electrode 122, electric field distortion may increase due to a fringing field, and it may be highly likely that breakdown voltage may occur in the margin portion taken in the width direction and the upper and lower cover regions 112 and 113.

A grain size of the active region 115 and the second and fourth regions may be greater than a grain size of the first and third regions. For example, a size of grains of a dielectric material forming the active region 115 and the second and fourth regions may be greater than a size of grains of a dielectric material forming the first and third regions. In this regard, an average grain size, a median grain size, a $D_{90}$ gain size, or the like of the active region 115 and of the first, second, third, and fourth regions may be used as a measure of grain size thereof.

When a medium is a non-magnetic material, electromagnetic waves may be generated on a boundary surface between a medium having a relatively high dielectric constant and a medium having a relatively low dielectric constant inversely proportional to a square root of a dielectric constant.

A dislocation pattern on an end of the internal electrode of the multilayer capacitor may be radiated externally of the multilayer capacitor, and the pattern may be refracted towards a side having a higher dielectric constant on the boundary surface.

Due to the refractive relationship described above, an electric field may be enhanced in one portion, and an electric field may be weakened in the other portion, and particularly, an average electric field value on an interfacial surface taken in the Y direction and the Z direction, on which the active region and the margin portion are in contact with each other, may decrease as a difference in dielectric constants increases.

Also, the active region may implement electrical properties of the multilayer capacitor, such as capacitance, whereas the width margin and the upper and lower cover regions may not be associated with the formation of capacitance.

Thus, in the multilayer capacitor in the example embodiment, a dielectric constant of the active region implementing effective capacitance may be configured differently from a dielectric constant of the margin portion which does not affect electrical properties, and a difference between a dielectric constant A of the active region 115 and the second and fourth regions on an external side of the margin portion and a dielectric constant B of the first and third regions on an internal side of the margin portion may be configured to satisfy $0.5 \leq B/A$.

To configure the regions to have respective dielectric constants A and B different from each other as described above, a composition of a dielectric material of the active region 115 in which the internal electrodes are disposed may be configured differently from a composition of a dielectric material forming an internal portion of the margin portion taken in the width direction and a composition of a dielectric material forming an internal portion of the cover region adjacent the active region.

For example, a difference in dielectric constants may be generated by adjusting an accessory ingredient included in a dielectric material included in the active region 115 in which the internal electrodes are disposed and an accessory ingredient included in a dielectric material included in an internal portion of the margin portion taken in the width direction and an internal portion of the cover region adjacent the active region.

Also, a content of an accessory ingredient included in a dielectric material included in an external portion of the margin portion taken in the width direction and an external portion of the cover region outside of the active region may be configured similarly to a content of an accessory ingredient included in the active region in which the internal electrodes are disposed, thereby generating a difference in dielectric constants.

Breakdown voltage, one of defects of a multilayer capacitor, may be caused by an electric field intensely formed on an end of an internal electrode.

In the example embodiment, as A and B satisfy $0.5 \leq B/A$, the concentration of an electric field may be alleviated by distributing an electric field on an interfacial surface near an end of the internal electrode while reducing a decrease in capacitance of the multilayer capacitor.

Accordingly, breakdown voltage of the multilayer capacitor may be prevented, and reliability of the multilayer capacitor may improve.

Figure 5:
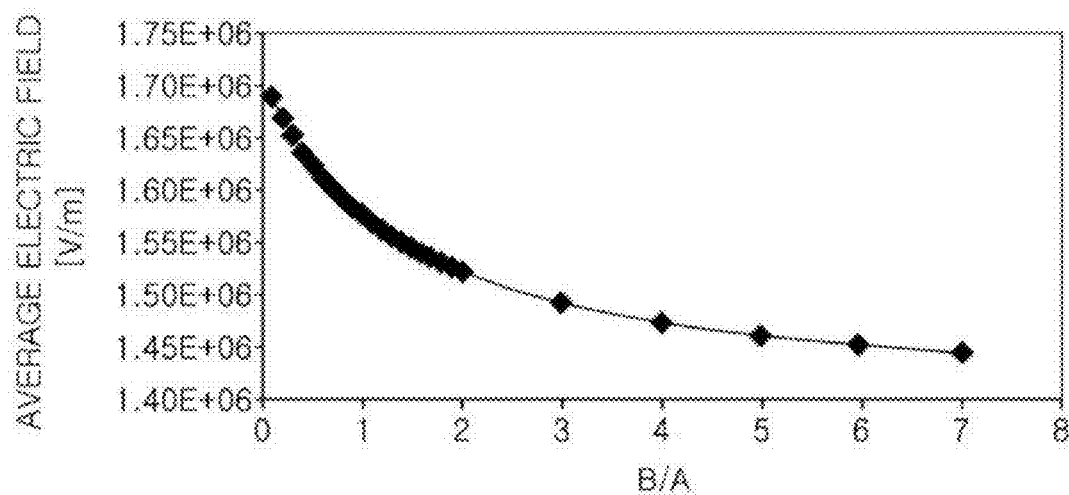
FIG. 5 is a graph illustrating an average electric field in accordance with changes in B/A.

FIG. 5 is a graph illustrating an average electric field in accordance with changes in B/A value of a multilayer capacitor, measured using Ansys Maxwell 2D Simulation.

In the example embodiment, the dielectric constant A of the active region 115 and the second and fourth regions of the multilayer capacitor was determined as 3000, B/A was adjusted by changing the dielectric constant B of the first and third regions, and a magnitude of an average electric field on an end of the internal electrode(s) in the multilayer capacitor was observed.

Referring to FIG. 5, when a value of B/A increased, a value of an average electric field of the multilayer capacitor decreased.

With reference to a value 1.0 of B/A at which the dielectric constant A of the active region and the second and fourth regions is the same as the dielectric constant B of the first and third regions, a value of an average electric field of the multilayer capacitor was only 3% increased as compared to when B/A was 0.5.

Table 1 below lists defect rates in accordance with changes in B/A through a voltage test.

B/A in each sample was configured differently by changing experimental conditions such as bonding of a material, a sintering condition, a mole ratio, and the like. The dielectric constants A and B were measured by inversion based on a fundamental experiment in which relationships between measured capacitance and a mole ratio and a grain size of when capacitance was measured were identified.

TABLE 1

| Classification | B/A Range | Number of Samples | Number of Samples of Defect of Electric Field on End of Internal Electrode | Defect Rate (%) |
| --- | --- | --- | --- | --- |
| 1 | 0.409~0.483 | 17 | 12 | 70.59 |
| 2 | 0.514~0.633 | 22 | 2 | 9.09 |
| 3 | 0.838~0.860 | 18 | 1 | 5.56 |
| 4 | 0.937~1.023 | 21 | 0 | 0.00 |
| 5 | 1.195~1.232 | 22 | 0 | 0.00 |

Referring to FIG. 1, when a value of B/A was less than 0.5, a defect rate of an electric field on an end of an internal electrode was high at about 70%.

From #2 in which a value of B/A was 0.5 or higher, the defect rate decreased to less than 10%, and in #4 and #5 in which a value of B/A was 0.937 or higher, the defect rate was 0, and no defect was observed.

Thus, a preferable range of B/A in which an electric field defect does not occur may be determined to be 0.5 or higher, and a more preferable range of B/A may be 0.937 or higher.

Figure 6:
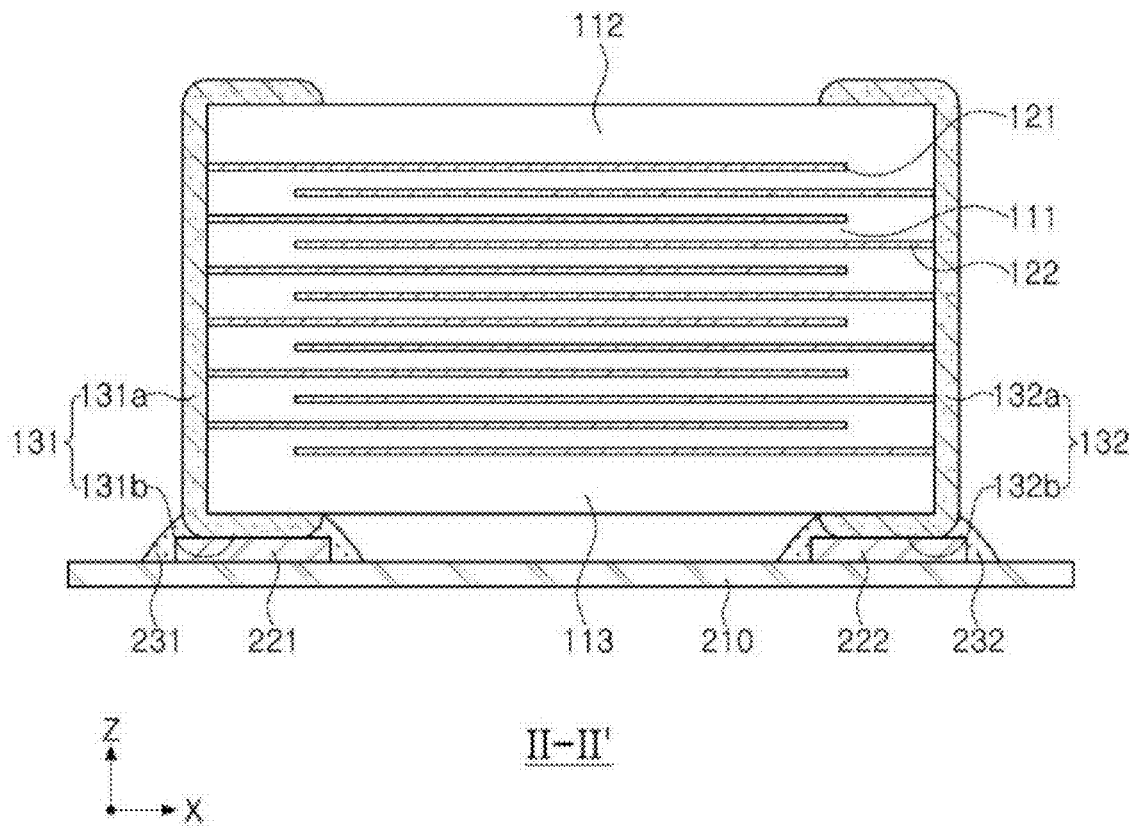
FIG. 6 is a cross-sectional diagram illustrating a substrate having the multilayer capacitor illustrated in FIG. 3 mounted thereon.

Referring to FIG. 6, a substrate on which the multilayer capacitor is mounted in the example embodiment may include a substrate 210 having first and second electrode pads 221 and 222 on one surface of the substrate 210, and a multilayer capacitor 100 in which first and second external electrodes 131 and 132 are mounted on an upper surface of the substrate 210 to be connected to the first and second electrode pads 221 and 222, respectively.

In the example embodiment, the multilayer capacitor 100 may be mounted on the substrate 210 by solders 231 and 232, but an example embodiment thereof is not limited thereto. If desired, a conductive paste may be used instead of solder.

According to the aforementioned example embodiments, by limiting a dielectric constant of the active region and a ratio of a dielectric constant of the internal margin portion to a dielectric constant of the external margin portion, the concentration of an electric field on an interfacial surface between the active region of the capacitor body in which an end of the internal electrode is exposed and the margin portion may be resolved, thereby preventing breakdown voltage and improving reliability of the multilayer capacitor.

While the exemplary embodiments have been shown and described above, it will be apparent to those skilled in the art that modifications and variations could be made without departing from the scope of the present invention as defined by the appended claims.

What is claimed is:

1. A multilayer capacitor, comprising:
a capacitor body including dielectric layers, first internal electrodes and second internal electrodes, and having first and second surfaces opposing each other, third and fourth surfaces connected to the first and second surfaces and opposing each other, fifth and sixth surfaces connected to the first and second surfaces and to the third and fourth surfaces and opposing each other, wherein the first internal electrodes are exposed through the third surface, and the second internal electrodes are exposed through the fourth surface; and
first and second external electrodes disposed on the third and fourth surfaces, respectively, and connected to the first and second internal electrodes, respectively,
wherein the capacitor body further includes an active region in which the first and second internal electrodes are alternately disposed with the dielectric layers interposed therebetween, and upper and lower cover regions disposed on the upper and lower surfaces, respectively, in a stacking direction of the active region,
wherein width margins of the capacitor body are disposed on opposite sides of the active region in a direction connecting the fifth surface and the sixth surface to each other, each width margin includes a first region disposed on an internal side thereof and a second region disposed on an external side thereof, and the upper and lower cover regions each include a third region disposed on an internal side thereof and a fourth region disposed on an external side thereof,
wherein the active region has a dielectric constant A, and the first region and the third region have a dielectric constant B, and
wherein A and B are different and satisfy $0.483 \leq B/A$.

2. The multilayer capacitor of claim 1, wherein A and B satisfy $0.514 \leq B/A$.

3. The multilayer capacitor of claim 1, wherein A and B satisfy 0.937≤B/A.

4. The multilayer capacitor of claim 1, wherein, when an average thickness of the dielectric layer is defined as C, an average thickness of the first internal electrode or the second internal electrode is defined as D, and an average width of the first region or the third region is defined as E and E satisfies C≤E and D≤E.

5. The multilayer capacitor of claim 1, wherein a grain size of the active region, the second region, and the fourth region is greater than a grain size of the first region and the third region.

6. The multilayer capacitor of claim 1, wherein an average thickness of the first and second internal electrodes is 0.4 μm or less.

7. The multilayer capacitor of claim 1, wherein an average thickness of the dielectric layer is greater than 0.5 μm.

8. A multilayer capacitor, comprising:
a capacitor body including dielectric layers, first internal electrodes and second internal electrodes, and having first and second surfaces opposing each other, third and fourth surfaces connected to the first and second surfaces and opposing each other, fifth and sixth surfaces connected to the first and second surfaces and to the third and fourth surfaces and opposing each other, wherein the first internal electrodes are exposed through the third surface, and the second internal electrodes are exposed through the fourth surface; and
first and second external electrodes disposed on the third and fourth surfaces, respectively, and connected to the first and second internal electrodes, respectively,
wherein the capacitor body further includes an active region in which the first and second internal electrodes are alternately disposed with the dielectric layers interposed therebetween, and upper and lower cover regions disposed on the upper and lower surfaces, respectively, in a stacking direction of the active region,
wherein width margins of the capacitor body are disposed on opposite sides of the active region in a direction connecting the fifth surface and the sixth surface to each other, each width margin includes a first region disposed on an internal side thereof and a second region disposed on an external side thereof, and the upper and lower cover regions each include a third region disposed on an internal side thereof and a fourth region disposed on an external side thereof,
wherein the second region and the fourth region have a dielectric constant A, and the first region and the third region have a dielectric constant B, and
wherein A and B are different and satisfy 0.5≤B/A.

9. The multilayer capacitor of claim 8, wherein A and B satisfy 0.514≤B/A.

10. The multilayer capacitor of claim 8, wherein, in the multilayer capacitor, A and B satisfy 0.937≤B/A.

11. The multilayer capacitor of claim 8, wherein, in the multilayer capacitor, when an average thickness of the dielectric layer is defined as C, an average thickness of the first internal electrode or the second internal electrode is defined as D, and an average width of the first region or the third region is defined as E and E satisfies C≤E and D≤E.

12. The multilayer capacitor of claim 8, wherein, in the multilayer capacitor, a grain size of the active region, the second region, and the fourth region is greater than a grain size of the first region and the third region.

13. The multilayer capacitor of claim 8, wherein, in the multilayer capacitor, an average thickness of the first and second internal electrodes is 0.4 μm or less.

14. The multilayer capacitor of claim 8, wherein, in the multilayer capacitor, an average thickness of the dielectric layer is greater than 0.5 μm.

15. The multilayer capacitor comprising:
a capacitor body including a dielectric material, and having internal electrodes including first internal electrodes and second internal electrodes that are alternately disposed with dielectric layers therebetween; and
first and second external electrodes disposed on external surfaces of the capacitor body and respectively connected to the first and second internal electrodes,
wherein an average thickness of the first and second internal electrodes is 0.4 μm or less, and a dielectric constant A of the dielectric layers in a region between the first internal electrodes and the second internal electrodes is different from a dielectric constant B of the dielectric material of the capacitor body in a region disposed between the internal electrodes and the external surfaces of the capacitor body, and
wherein A is smaller than B.

16. The multilayer capacitor of claim 15, wherein A and B satisfy 0.5≤B/A.

17. The multilayer capacitor of claim 15, wherein A and B satisfy 0.937≤B/A.

18. The multilayer capacitor of claim 15, wherein the capacitor body further includes a second region having the dielectric constant A and disposed between the external surfaces of the capacitor body and the region having the dielectric constant B.

19. The multilayer capacitor of claim 15, wherein the region having the dielectric constant B is disposed above an uppermost internal electrode and below an upper external surface of the capacitor body, and below a lowermost internal electrode and above a lower external surface of the capacitor body.

20. The multilayer capacitor of claim 15, wherein the region having the dielectric constant B is disposed between a first lateral edge of each of the internal electrodes and a first side external surface of the capacitor body adjacent the first lateral edge, and between a second lateral edge of each of the internal electrodes opposite the first lateral edge and a second side external surface of the capacitor body opposite the first side external surface.

21. A multilayer capacitor comprising:
a capacitor body including a dielectric material, and having internal electrodes including first internal electrodes and second internal electrodes that are alternately disposed with dielectric layers therebetween; and
first and second external electrodes disposed on external surfaces of the capacitor body and respectively connected to the first and second internal electrodes,
wherein an average thickness of the first and second internal electrodes is 0.4 μm or less, and a dielectric constant B of the dielectric material of the capacitor body in a first region disposed between the internal electrodes and the external surfaces of the capacitor body is different from a dielectric constant A of the dielectric material of the capacitor body in a second region disposed between the first region and the external surfaces of the capacitor body,
wherein A is smaller than B, and
wherein the dielectric layers disposed between the first and second internal electrodes in the capacitor body have the same dielectric constant A of the second region.

22. The multilayer capacitor of claim 21, wherein A and B satisfy 0.5≤B/A.

23. The multilayer capacitor of claim 21, wherein A and B satisfy 0.937≤B/A.

24. The multilayer capacitor of claim 21, wherein the first region having the dielectric constant B includes a first portion disposed above an uppermost internal electrode and below an upper external surface of the capacitor body, and a second portion disposed below a lowermost internal electrode and above a lower external surface of the capacitor body, and the second region having the dielectric constant A is disposed between the first portion of the first region and the upper external surface of the capacitor body, and between the second portion of the first region and the lower external surface of the capacitor body.

25. The multilayer capacitor of claim 21, wherein the first region having the dielectric constant B includes a first portion disposed between a first lateral edge of each of the internal electrodes and a first side external surface of the capacitor body adjacent the first lateral edge, and a second portion disposed between a second lateral edge of each of the internal electrodes opposite the first lateral edge and a second side external surface of the capacitor body opposite the first side external surface, and the second region having the dielectric constant A is disposed between the first portion of the first region and the first side external surface of the capacitor body, and between the second portion of the first region and the second side external surface of the capacitor body.

* * * * *